United States Patent [19]
Gipson et al.

[11] Patent Number: 6,148,911
[45] Date of Patent: Nov. 21, 2000

[54] METHOD OF TREATING SUBTERRANEAN GAS HYDRATE FORMATIONS

[75] Inventors: Larry P. Gipson, Anchorage, Ak.; Carl T. Montgomery, Plano, Tex.

[73] Assignee: Atlantic Richfield Company, Chicago, Ill.

[21] Appl. No.: 09/281,088

[22] Filed: Mar. 30, 1999

[51] Int. Cl.[7] .................................................. E21B 43/12
[52] U.S. Cl. ..................... 166/248; 166/272.1; 166/272.2
[58] Field of Search .................. 166/248, 272.2, 166/272.1, 271, 263, 276, 279, 308

[56] References Cited

U.S. PATENT DOCUMENTS

| | | | |
|---|---|---|---|
| 4,007,787 | 2/1977 | Cottle | 166/248 |
| 5,450,899 | 9/1995 | Beloneko et al. | 166/248 |
| 5,713,416 | 2/1998 | Chatterji et al. | 166/263 |
| 6,035,933 | 3/2000 | Khalil et al. | 166/263 |

OTHER PUBLICATIONS

M.R. Islam, Emertec Developments Inc., SPE 22924, A New Recovery Technique for Gas Production From Alaskan Gas Hydrates, Oct. 6–9, 1991.

Primary Examiner—Frank S. Tsay
Attorney, Agent, or Firm—Rodney B. Carroll

[57] ABSTRACT

A gas hydrate formation is treated by horizontally fracturing the formation, placing electrically conductive proppant particles in the fracture, and passing an electric current through the proppant particles in the fracture to generate sufficient heat to release gas from the hydrate. The method has particular application in shallow gas-bearing formations underlying or within the permafrost.

14 Claims, 2 Drawing Sheets

METHOD OF TREATING SUBTERRANEAN GAS HYDRATE FORMATIONS

BACKGROUND OF THE INVENTION

This invention relates to a method of fracturing and heating a gas hydrate formation to convert the hydrate into producible gas. In one aspect, the invention relates to a method of treating a subterranean formation underlying or within the permafrost.

The term "permafrost" refers to permanently frozen subsoil continuous in underlying polar regions and occurring locally in perennially frigid areas. Permafrost begins from a few inches to several feet below the surface and may extend downward as much as 1000 to 2000 feet, depending on its geographic location. In addition to granular ice in the interstices of the soil particles, there may be sizable bodies of solid ice.

In many areas, gas-bearing formations are found in close proximity to the base of the permafrost or within the permafrost itself. The proximity of the permafrost to gas formations has two significant effects: (1) the low temperature and pressure conditions of the gas in the presence of water results in a condition wherein the gas is trapped in a crystalline water structure in the form of a solid hydrate and (2) the low overburden pressure through the permafrost produces earth stresses such that fracturing treatments in or near the permafrost results in horizontal fractures.

The structure of the gas hydrate prevents removal of the gas from the formation by conventional production techniques. The application of heat, as by the injection of hot liquids, will cause the hydrate to dissociate and permit the release of gas, but the heat dissipates rapidly.

Hydraulic fracturing is a common technique of stimulating production by injecting a fluid into the formation at pressures and rates to cause the formation to fail and produce a fracture or crack therein. It is obvious that this technique is not applicable in gas hydrate formations because the hydrate remains immobile.

U.S. Pat. No. 5,620,049 discloses a well treatment process which combines hydraulic fracturing followed by heating the fracture using electric current. This process is disclosed in connection with the treatment of petroleum bearing formations, and not gas hydrate formations. The fracture generated in the subterranean formations disclosed in U.S. Pat. No. 5,620,049 is a vertical fracture. As described in more detail below, the method of the present invention requires that the fracture treatment produce horizontal fractures.

SUMMARY OF THE INVENTION

The method of the present invention involves the steps of:
(a) fracturing a subterranean gas hydrate formation to form a substantially horizontal fracture therein;
(b) introducing electrically conductive proppant particles into the fracture;
(c) permitting the fracture to close on the proppant particles; and
(d) passing an electric current from the surface through the wellbore and through the proppant particles to heat the formation in the immediate vicinity of the proppant particles to cause at least some gas to be released from the hydrate.

In a preferred embodiment, the electrically conductive proppant particles are coated with a heat hardenable, electrically conductive resin as described in U.S. Pat. No. 5,620,049, the disclosure of which is incorporated herein by reference.

DESCRIPTION OF PREFERRED EMBODIMENTS

As indicated above, the method of the present invention involves horizontally fracturing a gas hydrate formation followed by the application of heat. In order to fully appreciate the method of the present invention, it will be helpful to define the following terms:

(a) The term "gas hydrate formation" means a subterranean formation wherein all or some of the gas is present therein in the form of a hydrate, which is a clathrate compound formed by gas and water. The compounds are crystalline solids and generally comprise approximately 83% water and 17% gas. The hydrate may be present in the interstices of the formation or may be present as sizeable bodies of crystalline solids.

(b) The term "horizontal fracture" means a hydraulically induced fracture or crack that is hydraulically induced in a subterranean formation substantially horizontal or substantially parallel to the bedding plane of the formation.

Although the method of the present invention can be used to stimulate any gas hydrate formation, it has particular applicability in northern polar regions, such as Alaska. It is known that extensive layers of hydrates exist both within and below the permafrost. At the shallow depths of these formations (300 feet to 2500 feet) and low overburden pressures, hydraulic fracturing treatments initiate and propagate horizontal fractures in the formation. It is recognized that the vast majority of hydraulic fracture treatments at deeper depths, such as those of heavy oil-bearing formations, produce vertical fractures. For purposes of the present invention, and as explained in more detail below, it is fortunate that a horizontal fractures, rather than vertical fractures, are created in the gas hydrate formations.

The method of the present invention will be described with reference to a typical well completion illustrated in FIG. 1, (except for the electric equipment). It will be understood by those skilled in the art that other well completions may be employed.

Figure 1:
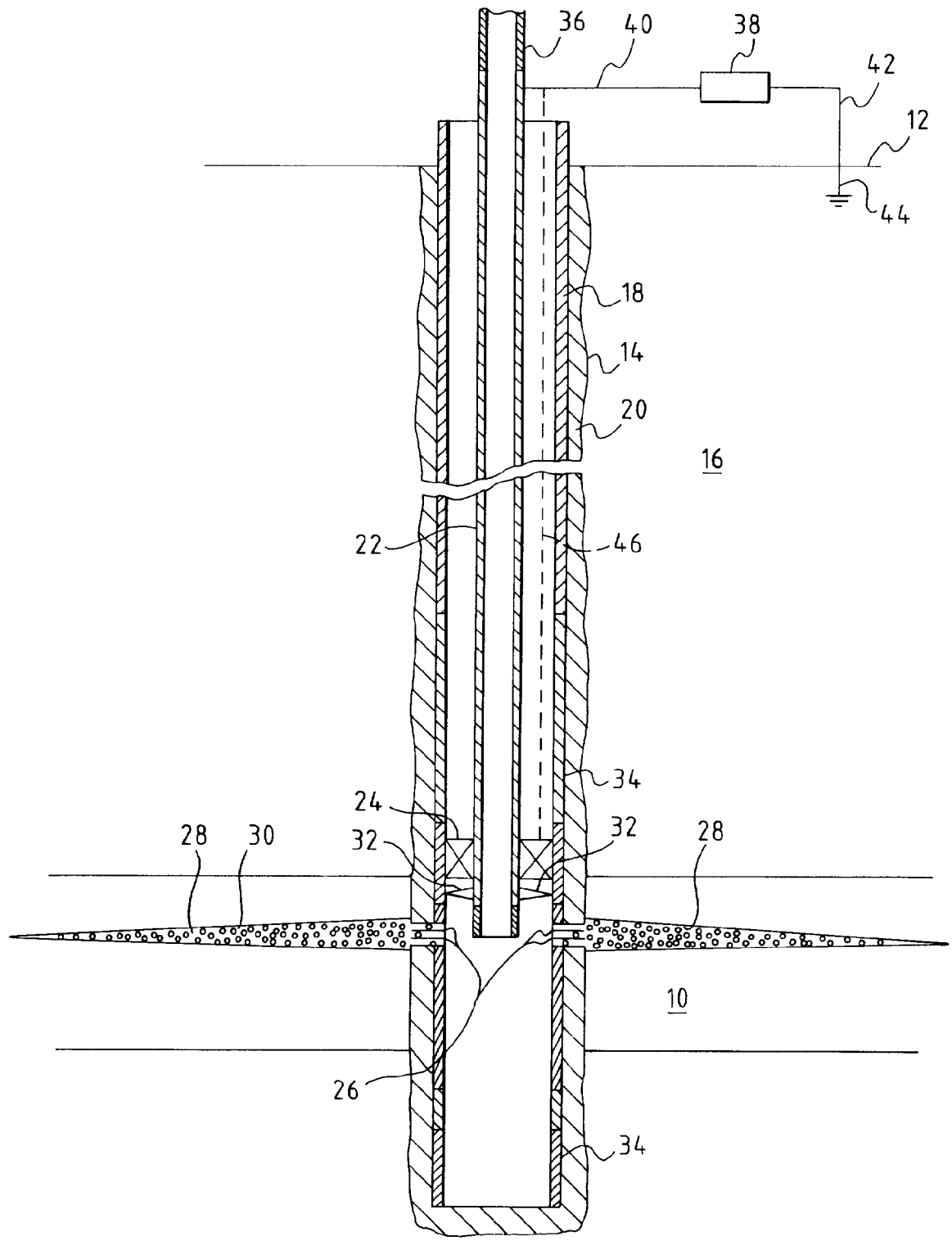
FIG. 1 is a schematic diagram of a wellbore extending from the surface of the earth into a subterranean gas hydrate formation with a proppant-filled horizontal fracture extending from the wellbore into the formation.

With reference to FIG. 1, a gas hydrate formation 10 is penetrated from a surface 12 by a wellbore 14 which extends from the surface 12 into or through the permafrost 16 to the subterranean formation 10. The wellbore 14 is cased with a casing 18 which is cemented in place by cement 20. The cement 20 extends along the entire length of the casing 18 and into a lower portion of casing 18. A tubing 22 is also positioned in the wellbore 14 and extends from the surface 12 into the formation 10. A packer 24 is positioned between an outer diameter of the tubing 22 and an inner diameter of the casing 18 near a top of the formation 10. The tubing 22 terminates in the vicinity of a plurality of perforations 26 through the casing 18 and the cement 20.

In order to conduct electrical current down the wellbore 14, a contactor 32 is positioned on a lower portion of the tubing 22. The casing 18 includes insulated sections 34 positioned above the contactor 32 and below the perforations 26. The tubing 22 also contains an insulated tubing section 36 to insure that electrical current passed to the tubing 22 passes through the tubing and the contactor 32. An electric power supply 38 is provided for supplying power via a line 40 to the tubing 22 with the electric power supply 38 being grounded via a line 42 to a ground 44. Alternatively, electrical power may be supplied via a line 46 (shown as a dotted line) which conducts electrical power directly to the packer 24 and then through the casing 18 into the formation 10 as described below.

The completion and operation of such wells to conduct electricity down a wellbore is considered to be known to those skilled in the art, and many of the features shown in FIG. 1 are known to those skilled in the art.

Figure 2:
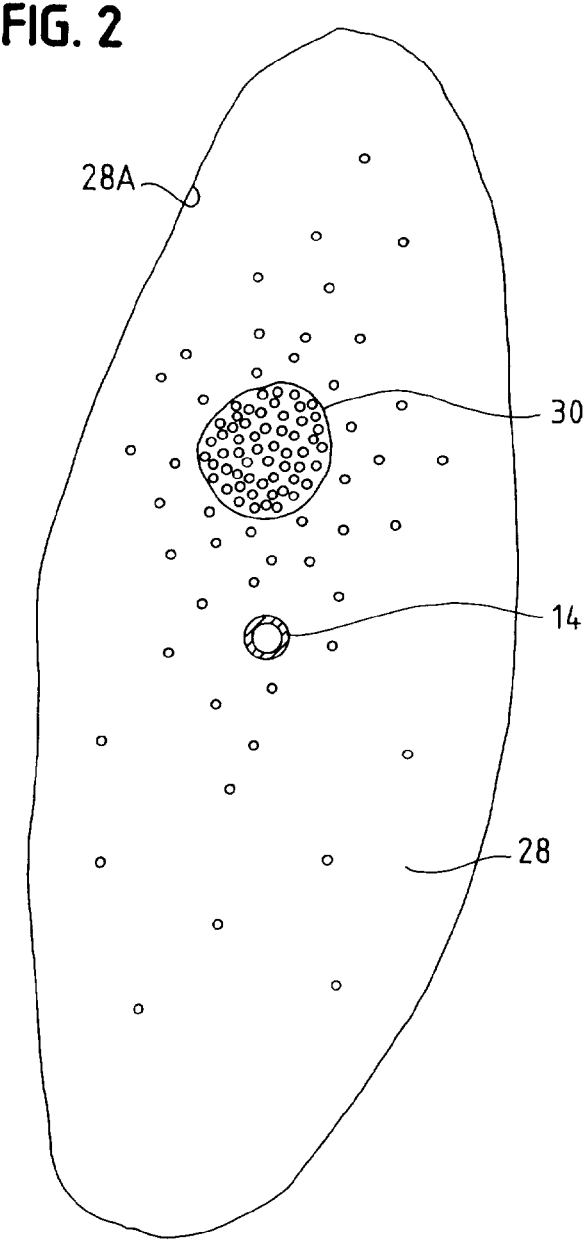
FIG. 2 is a horizontal view of the formation of FIG. 1, shown in schematic and illustrating the propagation limits of a horizontal fracture formed therein.

An important step of the present invention is to fracture the formation 10 by pumping a fluid down the tubing 22, through the perforations 26 and into the formation. The rate and pressure of the injection is high enough to cause the formation to fail. At the depth of the gas hydrate formation 10, the earth overburden stresses are such that when the formation rock fails, a horizontal crack (i.e., fracture 28) occurs. Continued injection of the fracturing fluid propagates the fracture 28 radially outwardly from the wellbore 14. The fracture 28, in all likelihood, will not be symmetrical, but will have an irregular shape, as schematically illustrated in FIG. 2, wherein reference numeral 28A schematically illustrates the outer periphery of the fracture 28.

The outer limits of the fracture may range from a few feet to several hundred, depending upon several factors, including the amount, rate, and properties of the fracturing fluid and the overburden pressure. During or after fracture propagation, proppant particles 30 are pumped into the fracture 28 and carried as deep as possible into the formation 10. Ideally, the proppant will substantially fill the fracture 28, but this is rarely, if ever, obtained. The proppant placement, however, should fill substantial portions of the fracture 28 and cover a large area.

Figure 3:
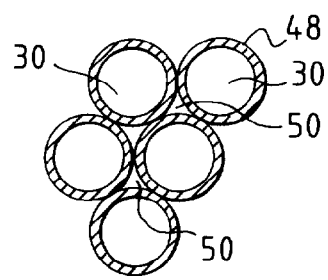
FIG. 3 shows an enlarged cross-sectional view of a plurality of proppant particles as positioned in the fracture shown in FIGS. 1 and 2.
Figure 4:
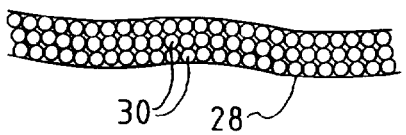
FIG. 4 shows a cross-sectional view of a vertical portion of a proppant-filled fracture in a consolidated formation.

Upon release of the fracturing pressure, the fracture 28 closes on the proppant particles 30 as illustrated in FIG. 3. This compresses the proppant particles 30 together, bringing them into contact, at least in large areas of the fracture 28.

The proppant particles 30 are preferably made of electrically conductive material. The proppant particles 30 may be selected from the group consisting of conductive metals, conductive metal alloys, conductive metal oxides, conductive metal salts, and combinations thereof.

Specific proppant particles include steel or iron shot, aluminum pellets, and metal-coated particles such as aluminum-coated plastic, and resin-coated particles (described below). The proppant particles 30 may be hollow, solid, porous, scintered, or agglomerated. All that is necessary is that the particles conduct electricity.

The preferred proppant particles are particles coated with a heat hardenable, electrically-conductive resin which, upon heating, softens and bonds to the adjoining particles and then hardens to aggregate the particles together in a coarse aggregate which fixes the particles 30 in place in the fracture 28 and provides a flow path for fluids within the aggregated particles in the fracture. One particularly suitable core for the coated particles is aluminum.

The core of the coated proppant particles may also be non-conductive. Suitable non-conductive core materials include substantially non-conductive ceramics, glass, sands, non-conductive inorganic oxides, non-conductive inorganic resins, non-conductive polymers and combinations thereof.

In a particularly preferred embodiment, the particles 30 are at least partially, and preferably, substantially completely coated with a heat hardenable, electrically conductive resin. The resin is present in an amount sufficient to consolidate the proppant particles 30 but insufficient to fill the openings (interstices) between the particles. Normally, the resin is present in an amount equal to from about 0.5% to about 6.0% based upon the weight of the proppant particles. Preferably, the resin is present in an amount equal to from 2 to 4 percent based upon the weight of the proppant particles.

FIG. 3 is an enlarged view of the preferred proppant particles 30 useable in the method of the present invention. Proppant particles 30 include a heat hardenable conductive resin coating 48 on their exterior surfaces so that when the proppant articles are placed in close contact in the fractures 28, the conductive heat hardenable resin surfaces 48 are in contact with each other. A plurality of openings 50 are formed between the proppant particles 30. When electrical energy is passed into the fractures 28, the heat hardenable resin first softens and adheres to surrounding particles and then hardens to aggregate the proppant particles 30 into an aggregated porous mass of proppant particles which are thereby fixed in place in the fracture 28. This provides a conductive and porous passageway for gas and water production from the fractures 28 through the openings 50 in the aggregated proppant particles and for conducting electrical current into the formation 10. The aggregated particles are much more strongly retained in the fracture 28. Particles precoated with conductive resins and typically set up to a temperature of about 135° F. are commercially available. A variety of particulate materials coated with a variety of conductive resins is available.

Typically, the proppant particles have an average particle size from about 60 to about 8 Tyler mesh. A correlation between Tyler mesh and particle diameter in inches is shown in "Propping Fractures with Aluminum Particles," L. R. Kern, T. K. Perkins and R. W. Wyant, *Journal of Petroleum Technology*, 583–588, June 1961. Larger or smaller particles can be used if required by the particular application.

The heat hardenable, electrically-conductive resin can comprise any one of a number of suitable resins mixed with finely divided, conductive material to obtain the desired degree of conductivity. One particularly suitable conductive resin comprises phenol formaldehyde resin containing finely divided graphite that is heat hardenable at temperatures of about 135° F. or above.

Operations

As indicated above, the purpose of the present invention is to treat gas hydrate to release and produce gas therefrom. Gas hydrate formations exist in polar regions and in shallow formations (e.g., 300 to 2500 feet), particularly offshore formations, and at low temperatures (e.g., 100° F. or less).

Initially, a hydrate formation is identified and a wellbore is drilled and completed as illustrated in FIG. 1. The well is then fractured, causing a horizontal fracture 28 to be formed in the formation as illustrated in FIGS. 1 and 2. The proppant particles 30 are placed in the fracture and the fracture pressure is bled off permitting the fracture walls to close on the proppant particles 30 as illustrated in FIG. 3.

The electric power supply then delivers an electric current via tubing 22 (or line 46) to the casing through contactor 32 to the proppant particles 30 in the formation 10. The heat generated by the flow of electricity through the proppant particles 30 heats the formation 10, releasing gas from the hydrate. The released gas then flows through the fracture into the wellbore 14 and up the tubing 22 to the surface.

The equipment used to pass electricity into such fractures is well known to those skilled in the art and will not be discussed further except to note that the contactor 32 can be an electrical contactor, or alternatively, conductive packs of conductive particles could be used at the outlet of the fracture 28 and the like. Similarly, contact with the fractures 28 may be made through the casing 18.

Having thus described the present invention by reference to certain of its preferred embodiments, it is pointed out that the embodiments described are illustrative rather than limiting, and that many variations and modifications may appear obvious and desirable to those skilled in the art based upon a review of the foregoing description of preferred embodiments.

What is claimed is:

1. A method of treating a subterranean gas hydrate formation penetrated by a wellbore, which comprises
    (a) fracturing the subterranean gas hydrate formation to form a substantially horizontal fracture therein;
    (b) placing electrically conductive proppant particles in the fracture;
    (c) permitting the fracture to close on the proppant particles;
    (d) passing an electric current from the surface through the wellbore and through the proppant particles to heat the formation in the immediate vicinity of the proppant particles to cause at least some gas to be released from the hydrate; and
    (e) producing the released gas through the fracture and up the wellbore.

2. The method of claim 1 wherein the electrically conductive proppant particles comprise particles which are at least partially coated with a heat hardenable conductive resin and wherein the electric current passed through the proppant particles causes the conductive resin to harden, thereby aggregating at least some of the particles together.

3. The method of claim 2 wherein the particles which are coated are non-conductive.

4. The method of claim 3 wherein the particles are of a material selected from the group consisting of ceramics, glass, sands, inorganic oxides, organic resins and polymers and combinations thereof.

5. The method of claim 2 wherein the particles are substantially completely coated with the heat hardenable, electrically-conductive resin.

6. The method of claim 5 wherein the resin is present in an amount sufficient to consolidate the particles but insufficient to fill openings between the particles.

7. The method of claim 1 wherein the particles are of a material selected from the group consisting of conductive metals, conductive metal alloys, conductive metal oxides, conductive metal salts, and combinations thereof.

8. The method of claim 1 wherein the particles are aluminum pellets.

9. The method of claim 1 wherein the particles have an average particle size from about 60 to about 8 Tyler mesh.

10. The method of claim 9 wherein the conductive resin comprises a phenol formaldehyde resin containing graphite which is heat hardenable at temperatures above about 135° F.

11. The method of claim 10 wherein the conductive resin is present in an amount equal to from about 0.5 to about 6.0 weight percent based upon the weight of the proppant.

12. The method of claim 1 wherein the initial formation temperature is less than about 135° F.

13. The method of claim 1 wherein at least substantial portions of gas hydrate formation underlies or penetrates a permafrost region.

14. The method of claim 13 wherein the hydrate formation is from 300 feet to 2500 feet below the surface.

* * * * *